(12) United States Patent
Robson et al.

(10) Patent No.: US 8,537,774 B2
(45) Date of Patent: Sep. 17, 2013

(54) CAPACITY OPTIMISATION IN A CELLULAR WIRELESS NETWORK

(75) Inventors: Julius Robson, Paris (FR); Mathieu Boue-Lahorgue, Paris (FR); Simon Avis, Essex (GB); David Bevan, Hertfordshire (GB); Steven Hall, Essex (GB); Andrew Jeffries, Essex (GB)

(73) Assignee: Apple Inc., Cupertino, CA (US)

( * ) Notice: Subject to any disclaimer, the term of this patent is extended or adjusted under 35 U.S.C. 154(b) by 1055 days.

(21) Appl. No.: 11/966,082

(22) Filed: Dec. 28, 2007

(65) Prior Publication Data

US 2009/0046665 A1 Feb. 19, 2009

(30) Foreign Application Priority Data

Aug. 16, 2007 (EP) .................................. 07291019.3

(51) Int. Cl.
*H04W 4/00* (2009.01)
(52) U.S. Cl.
USPC .......................................................... 370/331
(58) Field of Classification Search
USPC ................. 370/332; 455/451, 444, 453, 403, 455/422.1, 436
See application file for complete search history.

(56) References Cited

U.S. PATENT DOCUMENTS

| | | | | |
|---|---|---|---|---|
| 5,459,727 A | * | 10/1995 | Vannucci | 370/332 |
| 5,856,971 A | * | 1/1999 | Gitlin et al. | 370/335 |
| 6,363,252 B1 | * | 3/2002 | Hamalainen et al. | 455/436 |
| 6,600,924 B1 | * | 7/2003 | Sinivaara et al. | 455/444 |
| 6,845,238 B1 | * | 1/2005 | Muller | 455/436 |
| 7,072,317 B2 | * | 7/2006 | Vakil et al. | 370/332 |
| 7,295,513 B2 | * | 11/2007 | Elliott et al. | 370/229 |

(Continued)

OTHER PUBLICATIONS

Konstantinos Dimou, Ramon Agüero, Marcin Bortnik, Reza Karimi, Georgios P. Koudouridis, Stephen Kaminski, Horst Lederer, Joachim Sachs, Generic Link Layer: A Solution for Multi-Radio Transmission Diversity in Communication Networks Beyond 3G, Proceedings of the 62nd IEEE Vehicular Technology Conference, pp. 1672-1676, Sep. 28, 2005.*

(Continued)

*Primary Examiner* — John Blanton
*Assistant Examiner* — Christopher Crutchfield
(74) *Attorney, Agent, or Firm* — Meyertons, Hood, Kivlin, Kowert & Goetzel, P.C.

(57) ABSTRACT

Embodiments of the invention relate to cellular wireless networks and are particularly suited to networks including different types of base stations. So-called femtocell base stations are typically deployed within a subscriber's premises and operate at low transmit power, providing a very limited area of wireless coverage. A femtocell is typically deployed within the area of wireless coverage of a conventional macrocell type of base station, and if handover from a macrocell is performed on the basis of the best signal to noise plus interference ratio, a connection is likely to be transferred to another macrocell rather than to a femtocell. However, in view of the low density of user equipments capable of transceiving with a femtocell, the femtocell could potentially provide a greater data rate to the user equipment terminal than is possible with a macrocell. A cellular wireless network according to an embodiment of the invention employs a method of handover algorithm that has dependence on both a measure of signal quality such as signal to noise plus interference ratio and on a measure of loading of the base station. The handover algorithm is thereby able to weight selection of a base station on the basis of data rate, and intelligently engineer handover to a femtocell.

44 Claims, 5 Drawing Sheets

(56) References Cited

U.S. PATENT DOCUMENTS

| | | | |
|---|---|---|---|
| 7,373,151 B1* | 5/2008 | Ahmed | 455/452.2 |
| 7,430,420 B2* | 9/2008 | Derakhshan et al. | 455/452.2 |
| 7,457,622 B2* | 11/2008 | Kayama et al. | 455/437 |
| 7,457,623 B2* | 11/2008 | Naghian et al. | 455/439 |
| 7,551,586 B1* | 6/2009 | Yew et al. | 370/332 |
| 7,613,444 B2* | 11/2009 | Lindqvist et al. | 455/403 |
| 7,826,796 B2* | 11/2010 | Matsunaga | 455/63.3 |
| 2003/0013452 A1* | 1/2003 | Hunt et al. | 455/449 |
| 2004/0204097 A1* | 10/2004 | Scheinert et al. | 455/561 |
| 2005/0113093 A1* | 5/2005 | Mohebbi | 455/436 |
| 2005/0130644 A1* | 6/2005 | Bassompierre et al. | 455/422.1 |
| 2005/0181739 A1* | 8/2005 | Krasny et al. | 455/69 |
| 2006/0227796 A1* | 10/2006 | Wei et al. | 370/412 |
| 2007/0097938 A1* | 5/2007 | Nylander et al. | 370/338 |
| 2007/0133472 A1* | 6/2007 | Kim et al. | 370/332 |
| 2007/0177510 A1* | 8/2007 | Natarajan et al. | 370/238 |
| 2008/0049675 A1* | 2/2008 | Burgan et al. | 370/331 |
| 2008/0225801 A1* | 9/2008 | Turk | 370/332 |
| 2008/0232326 A1* | 9/2008 | Lindoff et al. | 370/332 |
| 2009/0003279 A1* | 1/2009 | Abusch-Magder et al. | 370/331 |
| 2009/0109979 A1* | 4/2009 | Tong et al. | 370/397 |
| 2010/0034148 A1* | 2/2010 | Zhang et al. | 370/328 |
| 2010/0061343 A1* | 3/2010 | Kazmi et al. | 370/332 |

OTHER PUBLICATIONS

H. Reza Karimi, Konstantinos Dimou, Georgios P. Koudouridis, Peter Karlssonn, Switched Multi-Radio Transmission Diversity for Non-Collocated Radio Accesses, Proceedings of the 63nd IEEE Vehicular Technology Conference, pp. 1167-1171, May 10, 2006.*

G.P. Koudouridis, R. Agüero, E. Alexandri, J. Choque, K. Dimou, H.R. Karimi, H. Lederer, J. Sachs, R. Sigle, Feasibility Studies and Architecture for Multi-Radio Access in Ambient Networks, pp. 1-12, 15th Wireless World Research Forum, 2005.*

G.P. Koudouridis, R. Agüero, E. Alexandri, J. Choque, K. Dimou, H.R. Karimi, H. Lederer, J. Sachs, R. Sigle, Generic Link Layer Functionality for, Multi-Radio Access Networks, Proceedings of IST Mobile and Wireless Communications Summit 2005, pp. 1-5.*

Per Magnusson, Johan Lundsjö, Joachim Sachs, Pontus Wallentin, Radio Resource Management Distribution in a Beyond 3G Multi-Radio Access Architecture, Proceedings of IEEE Globecomm 2004, pp. 3472-3477.*

Miguel Berg, and Johan Hultell, On Selfish Distributed Access Selection Algorithms in IEEE 802.11 Networks, IEEE 64th Conference on Vehicular Technology, Sep. 28, 2006, pp. 1-6.*

O. Yilmaz, Access Selection in Multi Access Cellular and WLAN Netwoks: Master's Degree Project, pp. 1-43, Feb. 2005.*

* cited by examiner

CAPACITY OPTIMISATION IN A CELLULAR WIRELESS NETWORK

FIELD OF THE INVENTION

The present invention relates generally to cellular wireless data communications networks, and more specifically to a method and apparatus relating to methods of optimising the capacity of a cellular wireless network.

BACKGROUND OF THE INVENTION

The concept of the home deployed base station, or femtocell, is considered of increasing importance for cellular network operators. Femtocells operate at low downlink transmit power, and are designed to improve the cellular coverage within a home or enterprise environment and their immediate surroundings. They would typically be linked into the wider cellular Radio Access Network through a customer's broadband link (e.g. digital subscriber line, cable, passive optical network or other wireline access technology).

Although generally placed indoors, femtocells operate within an existing conventional cellular wireless network, which is termed a macrocellular network. If the femtocells are configured for open access, (that is, where all users who are capable of receiving a signal from a given femtocell can use it to provide cellular access irrespective of whether or not they are the owner of the femtocell in question), then the number of potential base stations through which a user can connect to the network is greatly expanded to cover all those macrocells and femtocells with sufficiently high received signal-to-interference-and-noise ratio. Femtocells may in principle be operated in a separate frequency band from that used by macrocells to minimise interference between the two systems, but this involves the use of additional licensed spectrum; in general femtocells are therefore operated in the same frequency band as is used by macrocells.

The term "base station" is used here to refer to a radio transceiver connected to a telecommunications network; a cell site may have several base stations, each serving a different area of wireless coverage. This deployment of multiple base stations at a cell site is particularly common for macrocellular networks, but typically femtocell base stations are proposed to be used individually, with an omni-directional antenna. The user equipment terminal, often a mobile device, is referred to simply as a "user equipment".

The use of femtocells is particularly applicable to high capacity packet data cellular wireless communication systems such as HSPA ('High Speed Packet Access'), a so-called third generation evolutionary system, and LTE (Long Term Evolution), often referred to as a fourth generation (4G) systems. Applications used with such systems can typically accommodate a variable data rate to and from the user equipment, and can exploit a greater data rate should it be available, for example for the faster transfer of data files. It is accordingly advantageous to maximise the data capacity available to a user, and to this end adaptive modulation and coding is typically employed. The provision of a femtocell within a subscriber's premises can provide a high capacity link within a small local area that will typically also be within the coverage area of a macrocell.

The use of Best Server Selection (BSS) has been proposed for the HSPA system and is also applicable to the LTE systems. This refers to a method by which the base station, also referred to as a server and used for the transfer of data to and from a user equipment, is selected from a so-called active set on a packet by packet basis. That is to say, signalling is maintained between each user equipment and an active set of base stations (provided that signals can be received from more than one base station), but payload data is only sent between the user equipment and one of the active set to achieve efficient use of the radio resource. The base station with which the highest quality of signals is exchanged is typically selected on the basis of the capacity of the respective links, this being dependent on the adaptive modulation and coding provided thereby. This is in contrast to third generation systems such as UMTS release 99, in which so-called soft handover is used, and involves several base stations within an active set simultaneously transmitting the same payload data to a user equipment. The user equipment then combines the payload data using a combining algorithm; this is a robust system but has less potential data capacity than the BSS approach.

As is well known in the art, the concept of handover refers to the process of changing the base station or set of base stations that communicate payload data with a user equipment. The process of handover has evolved between generations of cellular wireless; first and second generation systems employed what may be termed hard handover, in which data payload communication was transferred from a single base station to another base station. In third generation systems, as already discussed, an active set of base stations is maintained where possible, and handover relates to a change in the selection of the active set. In third generation evolutionary systems and fourth generation systems, handover again relates to the selection of an active set of base stations but in addition there is a process of selection of the best base station within the active set for data payload transfer, potentially on a packet-by-packet basis, a process known as re-pointing.

In the handover process, it is conventional to select base stations on the basis of received signal quality. In the case where base stations serve a large number of user equipment terminals, it is typically assumed that the loading of each base station in terms of the bandwidth demands of the user equipment is reasonably equal, so the selection of base stations on the basis of signal quality is a reasonable approach to allocating resource.

However, in the case of potential handover and re-pointing between femtocells and macrocells the situation is different. In this case there may be a large imbalance between the number of user equipments served by a macrocell base station and a femtocell base station: for example, there may be a hundred user equipments served by a macrocell base station but only one or indeed no user equipments served by a femtocell base station at a given time. There may be a situation in which a user equipment receives a strong signal from a macrocell base station and a weaker signal from a femtocell base station. It would be expected that the operation of adaptive modulation and coding will typically enable a higher channel data rate using the strongest signal, but this data rate is shared between the user terminals communicating with the base station. It can be seen that a handover or re-pointing selection on the basis of signal quality may not maximise the data capacity available to the user equipment in this situation.

Various workers have documented the criteria used to perform soft and/or hard handover in various network environments. For example, the concept of using base station loading conditions, as opposed or in addition to signal quality information, as a basis for hard handover decisions between cells in a macrocellular network is known from International Patent application having publication number WO2004/019643. A method of managing wireless LAN resources for performing dynamic allocation of bandwidth to passing mobile terminals in dependence on the fixed subscribers instantaneous traffic load over the wireless LAN and over the broadband access line is described in international patent application having publication number WO2004/034646. The idea of allocating mobile stations to an unlicensed mobile network controller (UNC) in an unlicensed mobile radio access network is described in international patent application having publication number WO2006/024887. In the arrangement described in this application, a UNC is logically divided into differing roles (provisioning, default and serving) and a mobile station is assigned to a UNC on the basis of operation, maintenance and configuration activities in the network so as to improve load balancing in the network.

SUMMARY OF THE INVENTION

In accordance with a first aspect of the present invention, there is provided in a radio communications network comprising a first base station, a second base station and a first user equipment terminal, a method of optimising downlink data rate available at the first user equipment terminal, the method comprising the steps of:

receiving first and second measures of signal quality of radio communications received at the first user equipment terminal from the first and second base stations respectively;

receiving first and second measures of loading of the first and said second base stations respectively, wherein the first and second measures of loading relate to radio resource or to backhaul resource;

selecting the first or second base station for transmission of a data packet to the first user equipment terminal in dependence on the first or second measures of signal quality and the first or second measures of loading.

Thus with embodiments of the invention the available downlink data rate, that is the data rate in a link from one or other of the first or second base stations to the first user equipment terminal, is optimised by selection of the first or second base stations for transmission of a data packet. This selection is carried out on the basis of measures of signal quality and measures of loading of respective base stations, with the benefit that any given packet is sent from the base station that is estimated to provide the best effective data rate to the first user equipment terminal. In a system operating adaptive modulation and coding, data rate is dependent on signal quality. In a network serving multiple user equipment terminals, data rate is dependent on the sharing of resources between user equipment terminals, as can be estimated by various measures of loading.

Advantageously, the first and second base station are of different types: preferably the first base station is a macrocell base station and the second base station is a femtocell base station. Conveniently, the area of wireless coverage of the second base station falls within the area of wireless coverage of the first base station. The benefit of this arrangement of base stations is that the data rate available to the first user equipment terminal can be optimised by selecting communication with one of the base stations according to the signal quality at the location of the user equipment terminal or according to a measure of loading.

In addition to measures relating to loading of the radio resource due to sharing between user equipment terminals, measures of the loading of the backhaul links between the basestations and a telecommunications network are also taken into account in the selection process. Particularly in the case of femtocell basestation, the backhaul may be the limiting factor to available data rate rather than the availability of radio resource. A femtocell is typically deployed at a customer's premises and the backhaul may for example be a digital subscriber line which may be shared with other services at the home. The loading of the backhaul may therefore have an influence on the available data rate.

Preferably, the selection of base station for the transmission of a data packet is carried out once for each data packet in a message comprising a plurality of data packets. This may be carried out in a best server selection system, in which the first user equipment terminal is re-pointed to a server on a per data packet basis. As a result a base station can be selected for transmission of individual data packets with the benefit that the data rate is optimised in situations where the signal quality or loading is changing during the period of transmission of the entire message.

Further features and advantages of the invention will become apparent from the following description of preferred embodiments of the invention, given by way of example only, which is made with reference to the accompanying drawings.

DETAILED DESCRIPTION OF THE INVENTION

In general, the present invention is directed to methods and apparatus that optimise the effective downlink data rate available at user equipment in a cellular wireless network. For clarity, the methods and apparatus are described in the context of a network comprising macrocells and femtocells operating within a high speed packet data system such as HSPA or LTE, but it will be appreciated that this is by way of example and that the methods and apparatus described are not limited to this example.

Figure 1:
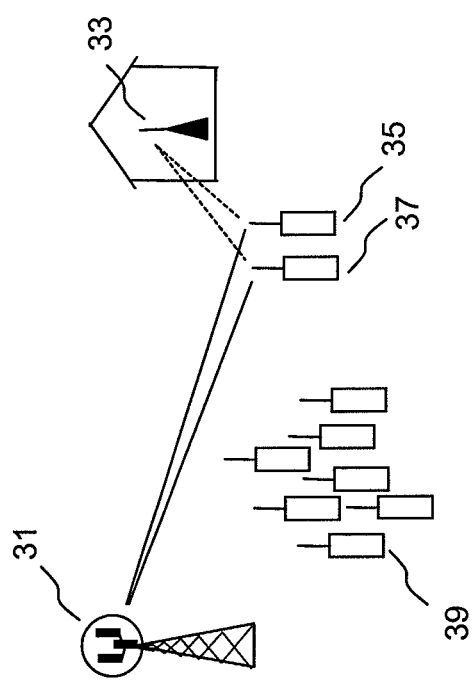
FIG. 1 is a diagram showing an environment in which rate-based handover occurs.

FIG. 1 shows a macrocell base station 31 in communication with two user equipments 35, 37. The two user equipments are also in communication with a femtocell base station 33. The macrocell base station can also be in communication with further user equipments, represented by part 39. In this example, only user equipments 35 and 37 are in communication with both the macrocell and femtocell base stations 31, 33, and the Best Server Selection (BSS) method is used. That is to say, communication is maintained with an active set of base stations, also known as an active set of servers, and a decision is made on a packet-by-packet basis as to which base station should transmit a downlink packet. As described above, this choice of base station for the sending of a packet is known as re-pointing.

Conventionally, for example in the HSPA and LTE systems, the re-pointing is determined on the basis of signal quality, such as received signal strength, signal to noise plus interference ratio (SNIR), or related measures of signal quality as discussed below. In comparison to these conventional methods, a measure of base station loading or backhaul loading is employed to determine the re-pointing. This provides a more realistic estimate of the data rate that can be achieved than is provided by the channel data rate since it takes into account timesharing of the radio or backhaul resource amongst user equipments, whereas the channel data rate simply indicates the total data rate available, which is to be shared amongst users. The approximation to the effective data rate may for example be a measure of signal quality divided by a measure of loading.

A femtocell base station will typically have far fewer user equipments in communication therewith than would a macrocell base station, since the femtocell transmits at lower power (and is often located indoors, restricting propagation distances). Consequently it will often be beneficial for some user equipments to be re-pointed to the lightly loaded femtocell, even though it may not provide the strongest signal, since the effective data rate achievable by communication with the femtocell base station may be higher. In face, by re-pointing users to femtocells the effective data rate to all users in a network is increased on average despite degrading the SNIR for some of the users of the macrocell through increased interference.

In addition to using a measure of base station or backhaul loading for re-pointing in a best server selection method, it may also be beneficial to use a measure of base station or backhaul loading in the process of selecting the active set of base stations within which the re-pointing is carried out.

Various measures of signal quality may be utilised in an embodiment of the invention in conjunction with measures of loading. Typical measures of signal quality will now be described, followed by a description of suitable measure of loading.

Clearly, it is advantageous to utilise measures of signal quality that are available in a conventional implementation, as the necessary information gathering and signalling will be in place. For illustrative purposes, the measures of signal quality that are available in the 3G HSPA ('High Speed Packet Access') system will now be described; it will be appreciated that similar measures are generally available in other cellular wireless systems.

HSPA is a cellular packet data system using both Best Server Selection and Adaptive Modulation and Coding (AMC). In a system such as HSPA, the user equipment is continually 're-pointed' to the instantaneously best server from within the handoff Active Set (AS) for transmission of the data, as has previously been described. Data is sent at the highest rate of modulation and coding that the link from the best base station server to user equipment will support, given the instantaneous channel condition, typically quantified in terms of SNIR, or some analogous measure of signal quality such as a Channel Quality Indicator (CQI). Conventionally, this instantaneous signal quality measure is used not only to choose the modulation and coding, but is also used to choose which among the servers in the Active Set is the 'best' server. The best server is conventionally deemed to be the one which provides the link with the best 'instantaneous' SNIR; this can be evaluated on the basis of the Received Signal Strength Indicator (RSSI) as seen at the user equipment. In one implementation it is the user equipment which makes the decision as to which is its best server to control the 're-pointing', and in an alternative implementation it is the network controller which makes the re-pointing decisions; this will be described in more detail below.

Turning now to loading on respective base stations, suitable measures thereof will now be described. One measure of loading, as mentioned in the above example, is simply the number of users being served by a given BS (macrocell and/or femtocell). There are several possible different measures of this, one being, if the access network is providing simple circuit switched (CS) connections, the number of user equipments who are allocated circuits on that server downlink. In packet switched (PS) networks, which are the networks of most interest, there is a wider choice of possible metrics, although the first of them is similar to the CS case. Some possibilities include (but are not limited to):

a) The number of 'sessions' or 'streams' being carried over the server (e.g. VoIP calls), multiplied by the mean data rate of each stream;

b) The total number of user equipments maintaining the server as part of an active set of servers;

c) The number of 'active' user equipments being served by a server (i.e. excluding user equipments which may be attached, but are not receiving any or much data);

d) The total size of the queues of data packets at the server, maybe averaged over some time interval, or maybe even the maximum queue size recorded over some recent time interval;

e) A measure of the latency of packets at the scheduler of a given server. This is an indirect measure of how busy a server is, because a very busy server is likely to introduce long packet delays;

f) A measure of the average data rate being provided to active user equipments attached to the given server. The applications using the wireless access link of such a server (e.g. if using TCP data transport) will tend to throttle back the data rate required to meet the supply provided. So if a server has many active user equipments (e.g. 100), then the applications running on those user equipments (e.g. file transfer) will tend to throttle back their data rates to match the size of the 'sub-pipe' provided (i.e. ~1/100th of the total pipe size). Conversely, if the candidate server is a femtocell, with only 2 user equipments currently attached, then those two user equipments will each see a large 'sub-pipe' roughly equal to half the datarate of the overall pipe. If the femtocell reports the average datarate being provided to those two user equipments, then it will report a large number, and this will mark it out as a promising handoff candidate (as long as the signal quality it is providing is not too poor). For this option to work, the server must therefore have some mechanism to (approximately) measure the average datarate being provided to the user equipments it is serving. A very simple implementation may be to divide the overall datarate by the number of user equipments it is serving;

g) A measure of the proportion of overall spectral resource (be it percentage of timeslots, or proportion of subcarriers, a measure of typically available 'symbols per second', or whatever) which the server expects to be able to provide to any new user equipment which would like to choose it as a server. For simple Round Robin (RR) scheduling, then this would simply be the reciprocal of the total number of users. However, by expressing it as a percentage of timeslots the network is able to account for the fact that it can offer some user equipments a higher priority (and thus a higher proportion of spectral resource) than others.

Figure 2:
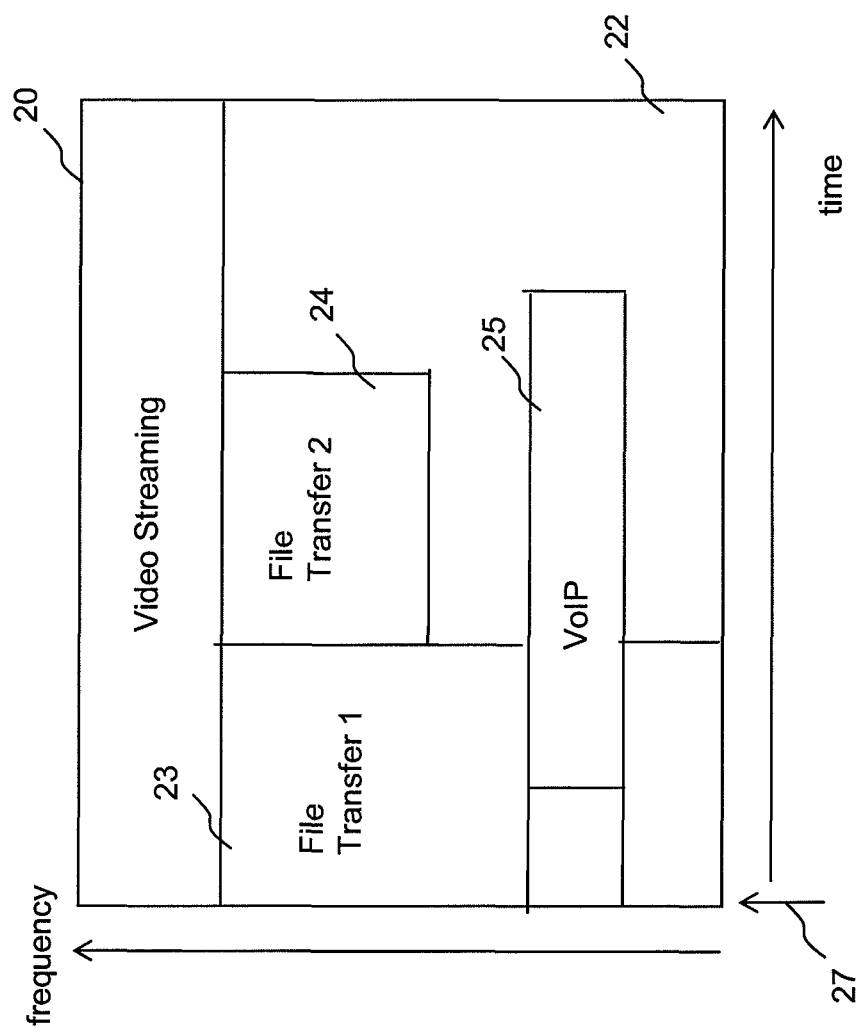
FIG. 2 is a diagram showing a loading table with a variety of services within a downlink frame.

All of the above measures of loading reflect an average figure for some network measure. An alternative perspective would be to use a more complete description of the combinations of subcarriers and timeslots allocated to the different traffic channels being transmitted, as illustrated in FIG. 2. FIG. 2 represents a loading table, which essentially is map of the radio resource allocation of a base station in terms of frequency against time The present time is indicated by numeral 27, and it can be seen that knowledge of future loading conditions is available. In this example, video streaming 20 is occupying some frequencies continuously, whereas two file transfer operations 23, 24 occupy less than the full timeslot shown, as does a voice over IP service 25. According to this metric, there therefore appears to be considerable spare radio resource available.

The cell selection process would involve selection of a base station which had the appropriate combination of time slots and subcarriers available for the requested user equipment service. In addition, a time evolution of the loading table could be evaluated so as to determine whether a given cell would become preferable at a future time: a user might be assigned to that base station on the basis that its service requirements cannot be met instantaneously, but can be met in the near future (that is, there are enough timeslots and subcarriers) without sacrificing the latency etc. required by the service.

The measures of BS loading described above have considered the loading in terms of downlink radio access. In most scenarios, this will be sufficient as a general measure of BS loading for informing hand over decisions. However, in some scenarios, downlink and uplink radio access loading may be very different for individual user equipments and for overall service provided by a BS to all its user equipments. In such scenarios, and in particular in frequency division duplex (FDD) systems, while downlink loading (for example in terms of proportion of spectral resource used) may be low, uplink loading may be high, and vice versa. Optionally measures of both uplink and downlink loading may used to inform handover decisions. Thus, for example, the effective data rate for both uplink and downlink may be determined using the respective measures of uplink and downlink loading and handover decisions made taking both uplink and downlink effective data rate into account.

The measures of BS loading described above have assumed that the femtocell has sufficient backhaul capacity (uplink and downlink) and processing power to fully service its maximum overall spectral resource available for user equipments. In many cases this is a reasonable assumption since the backhaul will typically be provided over a wireline technology such as a digital subscriber line or a passive optical network. However, femtocells are intended to be low-power devices and may be equipped with limited processing resources. Also femtocells will compete with other devices accessing the owner's broadband connection and may suffer a drop in backhaul capacity due to network congestion or fault. Accordingly, in embodiments of the invention, a measure of the assumed constant, instantaneous, or time evolved, backhaul capacity of a femtocell is considered in hand over decisions. If the backhaul capacity (either uplink or downlink) is insufficient to service the theoretical maximum overall spectral resource available, either due to network congestion or fault, due to contention with local demands on capacity, or due to limited processing resources, that measure of capacity may be used as the raw data rate in place of the maximum overall spectral resource.

As described above, there are several options for determining which network element controls handoff and/or re-pointing. The possibilities, together with the decision criteria used thereby include (but are not limited to):

i. The network controls the re-pointing:
  a) If it is the network which is controlling the handoff (and/or re-pointing) then, as in current systems, the network needs to receive from the user equipment of interest regular reports on the RSSI (or SNIR or CQI or some other metric) which it is seeing from the downlink pilots of its AS servers (and any other servers which could be suitable candidates to be added to the AS). Beyond that, however, the network needs to be monitoring the loading of the servers which are candidates for re-pointing. The network calculates an estimate of what 'Effective Data Rate' (EDR) is likely to be provided by each of the servers, and then re-points the user equipment to the server offering the highest estimated EDR. There are many possible places in the network this processing could be carried out. One possibility is for the calculations to be carried out in the primary server (or any other server) Base Station within the AS. If so, then the server must be communicating over the backhaul network with the other participating handoff servers in order to receive measures of their loading, to calculate the EDR that they could offer. Another possibility is that this processing is carried out in a different network element, such as a Radio Network Controller (RNC). However, in practice it is likely to be very desirable to make the re-pointing process as dynamic (i.e. rapid) as possible, which probably means it should be carried out in one of the AS Base Stations, perhaps the 'Primary' server in the AS.
  b) A slight variation on the technique described above could be employed by the network in order to balance loading across multiple network servers. The network may decide to re-point (or handoff) a user equipment to a server which is not necessarily 'best' in the traditional sense of SNIR/Spectral Efficiency, but instead is best in terms of most lightly loaded. This will usually also serve the user equipment's agenda of maximising its effective data rate, even if the handoff was not explicitly controlled for that exact purpose. If the dimension of time can additionally be considered by the entity managing handoff (e.g. in the form of expected transmission schedules of the multiple servers), this may indicate that one of the servers will, in the near future, become more lightly loaded than the others. In such a situation it may be advantageous to the network to re-point the user equipment to the server with the future gap in its transmission schedules, as long as its SNIR still meets some minimum threshold criterion. This approach could also take into account the mobility (velocity and/or direction) of the user equipment that is seeking service, in addition to the service type that it requests, so that a rapidly moving user equipment does not necessarily get handed off to a femtocell if it is soon to move out of the effective range of that femtocell. By balancing the load across the network in this way, the effect is to increase the volume of data transmitted and the capacity available;
ii. The user equipment of interest controls the re-pointing:
In this arrangement there needs to be a mechanism whereby the network can signal to the user equipment (over the wireless access link) the loading or 'busyness' (or whatever other metric) of the AS Base Stations. One possibility is that this is contained in specific signalling messages to the user equipment; for example, when a BS is added to the AS, it could signal its loading measure to the user equipment. This loading measure might be filtered over some time constant, to average out small instantaneous variations (and avoid instabilties as user equipments choose to leave-join-leave-join a server). The filtering time constant would dictate the required update rate of this information. A second possibility is that all servers continually broadcast information about their loading on a suitable broadcast channel (e.g. BCCH channel). Again, this information would probably need to be filtered, with some suitable update rate.

In general, the functionality of a network controller entity that gathers information on cell loading, SNIR, RSSI, user equipment service requests, user equipment velocity and/or direction, base station service commitments etc. to make the optimum selection of base station for the user equipment (to optimise datarate at the user equipment) and/or the network as a whole (to optimise the network capacity) could be either localised at a network node or distributed over a plurality of nodes of the network. Signalling messages may be used to communicate the level of base station loading to enable the base station selection decision to be taken at the network or user equipment level. For example, base stations may broadcast or unicast their loading information periodically or upon request.

Whilst the foregoing has considered the process of repointing, the EDR estimate might also be used to influence which servers should in the first place be added to the Active Set. In any event, whatever type of hard or soft handoff is being used, the handoff decisions are based not only on the spectral efficiency that each handoff candidate server could offer, but also on the proportion of the overall spectral resource that is expected to be offered in terms of the above described measures of loading.

A potential algorithm for use in evaluating handover compares the effective data rate available on one base station with that to which it could be potentially handed over, and to hand over if the difference in effective data rate is greater than a threshold value. Such a threshold (which may be zero) can be used to add hysteresis to the system and limit a ping pong effect by which a user equipment is handed over to one base station and then immediately returned due to an increase in load.

Preferably a suitable algorithm is used in both directions (macro to femto and femto to macro), since, if effective data rate handover is used only in one direction, the new BS will probably send the user equipment straight back to the original BS because the received signal power is higher there. In one arrangement the operator can configure the activation or not of this algorithm across parts, or all, of the network. It is also desirable to standardise the algorithm across the network, since use of different measures of data rate and load and/or different threshold values in different parts of the network may lead to unstable handover behaviour. If the algorithm is parameterized (which is desirable), the operator can configure a base station with consistent measures of data rate and load values across the network. Assuming measure f is related to signal quality and g related to load, the handover algorithm can compare f/g at each base station and hand over if the difference between the f/g value at a base station exceeds that at the current base station by a threshold value, T. In preferred arrangements the algorithm can have a standardized set of f and g functions and the operator can select one from the set.

In one arrangement f could be f(x)=ax+b with a and b configurable or f could be f(x)=ax$^2$+bx+c where a,b,c configurable. The parameter x could be a measure of signal quality such as SNIR or RSSI, for example. The g factor can similarly be expressed as a function of a load parameter or parameters. Alternatively, a measure of SNIR divided by the number of users of a base station could be used as an indicator of effective data rate in the above handover process. It is not necessarily linearly related to effective data rate, but a higher SNIR will indicate a higher or similar data rate.

Figure 3:
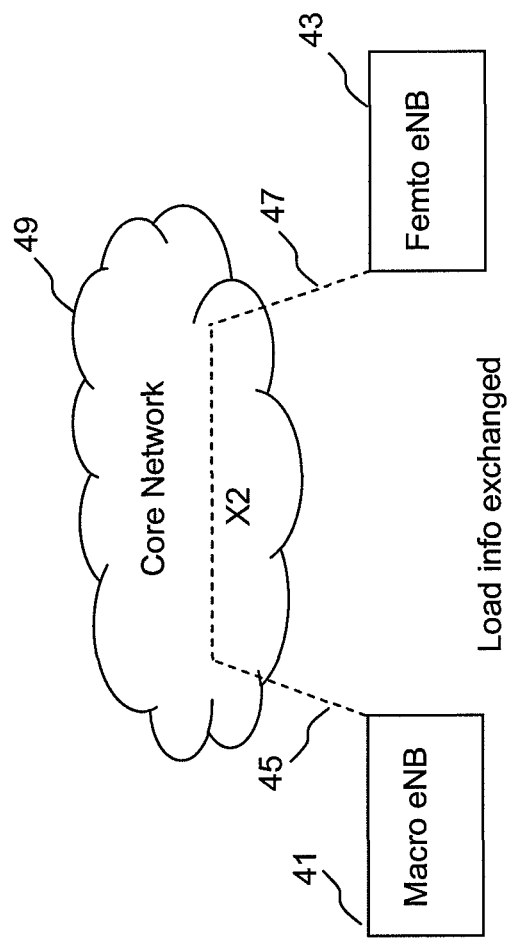
FIG. 3 is a diagram showing exchange of load information between a macrocell base station and a femtocell base station.

Turning to FIG. 3, an example of possible handover implementations based on signal quality and loading in a LTE system will now be described. As illustrated in FIG. 3, information indicating loading can be exchanged over the so called X2 interface which is the interface between eNBs (the term for base stations in LTE). This interface X2 will be set up between macro eNB 41 and femto eNB 43 through the core network 49 via backhaul links between the eNBs and the core network 45, 47. This interface X2 will provide the macro eNB and the femto eNB with information as to each other's load level in terms of any of the above described measures of load.

Turning now to measures of signal to noise and interference ratio (SNIR), Radio Resource Control (RRC) Measurement Control procedures enable the user equipment to report Target_cell_SNIR and source_cell_SNIR in RRC Measurement reports to the eNB, either periodically or when they exceed an absolute or relative threshold. This provides the serving eNb with the SNIR values seen by the user equipment on the macro and the femto cells. Signal to noise interference can additionally be measured by Reference Signal Received Quality (RSRQ).

In one arrangement SNIR can be converted to spectral efficiency using an algorithm. This algorithm, or a variant thereof, could be used to form an estimate of data rate, which could then be divided by the load to give a measure of effective data rate. This algorithm can be expressed in the following form:

$$\text{Throughput } Thr, \text{bps/Hz} = \begin{cases} Thr = 0 & \text{for } SINR < SNIR_{MIN} \\ Thr = \alpha \cdot S(SNIR) & \text{for } SNIR_{min} < SNIR < SNIR_{MAX} \\ Thr = Thr_{MAX} & \text{for } SNIR > SNIR_{MAX} \end{cases}$$

where:
S(SNIR) is the Shannon bound: S(SNIR)=log$_2$(1+SNIR) bps/Hz
α Attenuation factor, representing implementation losses
SNIR$_{MIN}$ Minimum SNIR of the codeset, dB
Thr$_{MAX}$ Maximum throughput of the codeset, bps/Hz
SNIR$_{MAX}$ SNIR at which max throughput is reached S$^{-1}$ (Thr$_{MAX}$), dB As described above, measurement reports (measurement report) can be transmitted periodically or in response to the occurrence of certain events. For the particular example of the evolving LTE standards, the periodically transmitted reports involve a user equipment sending every e.g. 500 ms a measurement report including the measurement it carried out during the previous period. The eNb then analyses the measurement report and decides whether or not a hand over (HO) is needed. It is to be noted that when using this periodical mode, a measurement report does not necessarily lead to a HO, and some uplink radio resource is wasted by unnecessary measurement reports. Event triggered measurement reports can be generated by the user equipment only if a certain condition is true, e.g. SNIR (neighbourcell)–SNIR (source_cell)>N dB. In this case, the conditions are usually set such that a measurement report is sent only when a hand over is needed. This provides much more efficient usage of radio resources. In order to use event triggered reporting mode for data rate HO, the user equipment has to be provided with the parameters of the algorithm (f and g functions and T value) as well as the load of source and neighbouring cells, and either the periodical mode or event triggered mode could be used in embodiments of the invention.

An illustration of the operation of an embodiment of the invention will now be described using specific examples of signal strengths and cell loading conditions with reference to FIG. 5 and to be contrasted with the operation of a conventional system in similar conditions, indicated in FIG. 4.

Figure 4:
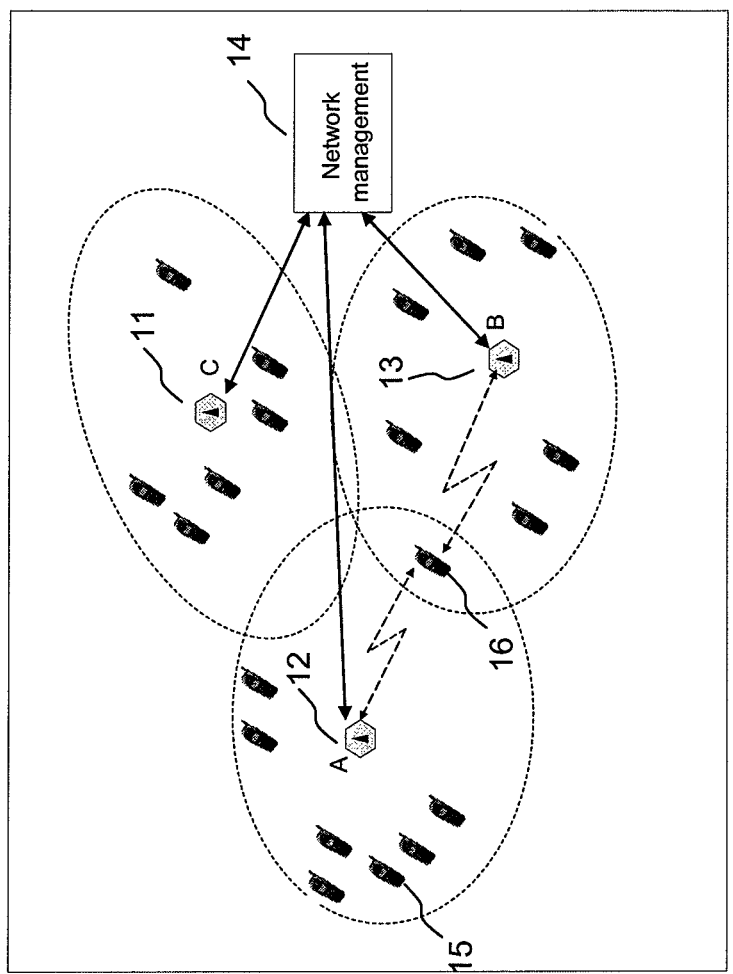
FIG. 4 is a diagram showing a conventional method of server selection in a macrocell only network.
Figure 5:
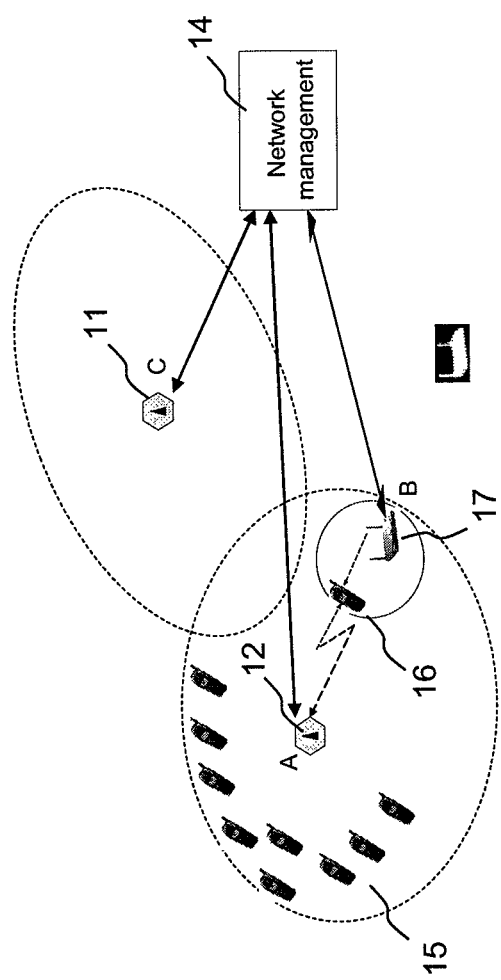
FIG. 5 is a diagram showing a method of server selection in a network including macrocells and femtocells according to an embodiment of the invention.

In a conventional system such as is shown in FIG. 4, the 'best' server is chosen as the server which is able to offer the best spectral efficiency. Spectral efficiency is expressed in terms of information bits per modulation symbol, more usually termed 'bits per second per Hz' (bps/Hz). For example, in FIG. 4, Server A, 12, may be offering an SNIR of, say, 15 dB, and so could use, say, 16-QAM modulation (4 coded bits per modulation symbol) with 3/4-rate coding (3 information bits per 4 coded bits). This therefore provides a 'spectral efficiency' of 4×(3/4)=3 bps/Hz. Server B 13 may be offering a lower SNIR of, say, 5 dB, and so maybe could only use QPSK modulation (2 coded bits per modulation symbol) with 1/2-rate coding (1 information bit per 2 coded bits), or a spectral efficiency of 2×(1/2)=1 bps/Hz. In a conventional system, server A would be chosen as the server to which the user equipment should be pointed, because it offers the link with the higher spectral efficiency.

By contrast, in an embodiment of the invention, the Effective Data Rate (EDR) is used as criterion for re-pointing; that is to say that the base station capable of providing the highest EDR is selected for the transmission of data. The EDR is a function not only of the spectral efficiency, but also of the loading of the chosen server. For example, assuming that the user equipment is able to achieve a spectral efficiency of 3 bps/Hz from server A, and that server A has a total data modulation symbol rate of 5 Msps (5 million data modulation symbols per second), if this user equipment were the only user equipment being served by Server A, then it could achieve a datarate of 5 Msps×3 bps/Hz=15 Mbps. This quantity can be termed the 'Raw Datarate' of the link, and measured in bits per second. In this example the Raw Datarate would be defined as the datarate which would be achieved if the user equipment were the only user equipment being served by that server, such that all of the data subcarriers on all of the data timeslots are made available to that user equipment. However, it is likely in practice that there are other user equipments being served by server A. Let us say for the sake of example that 29 other user equipments are being served by Server A. In this case, assuming a fair apportioning of timeslots to the 30 user equipments (i.e. 'Round Robin' scheduling), the user equipment of interest will only be served (on average) using one in every 30 timeslots. So the spectral resource which could be offered to this user equipment is only (1/30)×5 Msps=167 ksps, which is much less than the 5 Msps spectral resource which would be offered by Server A if this were the only user equipment being served by Server A. So the user equipment's Effective Datarate is only one 30th of its Raw Datarate, or (1/30)×15 Mbps=0.5 Mbps. Equivalently, the user equipment's EDR, if served by Server A, could be expressed as its spectral resource multiplied by its spectral efficiency, or 167 ksps×3 bps/Hz=0.5 Mbps. However, if the equipment of interest were to be re-pointed to server B, then it would have an SNIR of 5 dB, and a spectral efficiency of 1 bps/Hz. For a 5 Msps modulation rate this corresponds to a Raw Datarate of 5 Msps×1 bps/Hz=5 Mbps. Assuming server B is only actually currently serving one other user equipment, if the user equipment of interest were to be re-pointed to server B, then it would achieve an EDR of 5 Mbps/2 user equipments=2.5 Mbps, which exceeds the EDR it could achieve from Server A. Thus according to embodiments of the invention, server B would be selected instead of server A, whereas with conventional methods server A would be selected as a server.

In a homogeneous network of base stations (e.g. all Base Stations are macrocells), it may reasonably be assumed that all base stations have similar levels of loading, at least within a factor of around 2-3. So whilst the EDR is not exactly directly proportional to the Spectral Efficiency or Raw Datarate, it is quite closely related. So it is often true that the BS offering best Raw Datarate is also the BS offering best EDR.

With femtocell base stations, also known as home base stations ('Home Node Bs') the situation is different. A home base station is a very low-power, cheap and small base station, which a network subscriber may, for example, deploy in their living room, in the same manner as they might deploy a Wi-Fi Access Point (AP). Over the localised area of that femtocell's coverage, it can potentially offer a very high datarate in terms of Raw Datarate, in the areas where it is the dominant server. For example, if the femtocell is installed in the subscriber's living room then, for user equipments in the same room, the RSSI will be high, and therefore so will the Spectral Efficiency and Raw Datarate be high. However, it could be the case that out in the garden the RSSI is weak, and perhaps even weaker than the RSSI of the nearest macrocell. Turning to FIG. 5, and assuming that the femtocell corresponds to 'Server B' 17 of the example above, and the nearest macrocellular BS corresponds to 'Server A' 12, it can be seen that in the subscriber's garden, Server A (macrocell) offers an SNIR of 15 dB (and is currently actively serving 29 other user equipments), while Server B (femtocell) offers an SNIR of 5 dB (and is currently serving only 1 other user equipment).

As described above, according to systems of the prior art, the user equipment would choose to be served by the macrocell. However, as also shown by the calculations above, in terms of EDR the macrocell is an inefficient choice of 'best' server because femtocells are likely to have very much lower loadings (by a factor of 10-100× typically). For a homogeneous network of macrocells only, the loading disparity between neighbour macrocells is likely to be a factor of only 2-3 or so, whereas with femtocells, the loading disparity between neighbouring cells could well reach the order of 10-100. As a result, re-pointing is performed on the basis of EDR rather than simply on the basis of maximising Spectral Efficiency or Raw Datarate.

Whilst embodiments of the invention have described handover in the context of the evolving LTE and HSPA systems, it will be appreciated that embodiments of the invention are also applicable to other cellular radio systems.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of optimizing effective data rates available at a first user equipment terminal in a radio communications network comprising a first base station of a first type, a second base station of a second type that is different from the first type, wherein the method comprises:

determining first and second measures of signal quality of radio communications received at the first user equipment terminal from the first and second base stations respectively;

determining first and second measures of loading of the first and said second base stations respectively, wherein the first and second measures of loading each comprises both uplink and downlink measures of loading, and wherein the first and second measures of loading relate to radio resource or to backhaul resource;

determining a first uplink effective data rate and a first downlink effective date rate for the first user equipment terminal and the first base station based on the first measure of signal quality and the first measure of loading;

determining a second uplink effective data rate and a second downlink effective data rate for the first user equipment terminal and the second base station based on the second measure of signal quality and the second measure of loading;

comparing the first uplink effective data rate with the second uplink effective data rate;

comparing the first downlink effective data rate with the second downlink effective data rate;

selecting one of the first and second base station for communication based on said comparing the first uplink effective data rate with the second uplink effective data rate and on said comparing the first downlink effective data rate with the second downlink effective data rate; and performing communication between the selected base station and the first user equipment terminal based on said selecting.

2. The method of claim 1, wherein said selecting is performed by the first user equipment terminal.

3. The method of claim 1, wherein said selecting is performed by a server of the radio communication network.

4. The method of claim 1, wherein said selecting and said performing communication are performed on a packet-by-packet basis.

5. The method according to claim 1, wherein the first type of base station is a macrocell type and the second type of base station is a femtocell type.

6. The method according to claim 1, wherein the second base station has an area of cellular wireless coverage within an area of cellular wireless coverage of the first base station.

7. The method according to claim 1, wherein said selecting is performed in dependence on a service being provided or requested to be provided to the first user equipment terminal.

8. The method according to claim 1, wherein said comparing the first downlink effective data rate with the second downlink effective data rate comprises:

determining a difference between the first downlink effective data rate and the second downlink effective data rate; and comparing the difference to a threshold, wherein the threshold is greater than 0.

9. The method according to claim 1, wherein the first and second measures of the signal quality comprise or are derived from a measure of strength of signals received from the first and second base stations respectively at the first user equipment terminal.

10. The method according to claim 1, wherein the first and second measures of the signal quality comprise or are derived from a measure of signal to noise ratio or from a measure of signal to noise plus interference ratio of signals received from the first and second base stations respectively at the first user equipment terminal.

11. The method according to claim 1, wherein the first and second measures of loading comprise or are derived from measures of radio resource loading of the first and second base stations respectively.

12. The method according to claim 1, wherein the second measure of loading comprises or is derived from a measure of backhaul loading of the second base station.

13. The method according to claim 1, wherein the first and second measures of loading comprise measures of loading current when performing said selecting of a base station.

14. The method according to claim 1, wherein the first and second measures of loading comprise predicted measures of loading.

15. The method according to claim 1, wherein the first and second measures of loading comprise a number of circuits allocated to user equipment terminals on a downlink from each respective base station to the user equipment terminals.

16. The method according to claim 1, wherein the first and second measures of loading comprise a number of streams carried by the respective base station multiplied by the mean data rate of a respective stream.

17. The method according to claim 1, wherein the first and second measures of loading comprise the number of user equipment terminals maintaining a respective base station as part of an active set of servers.

18. The method according to claim 1, wherein the first and second measures of loading comprise the number of active user equipment terminals being served by a respective base station.

19. The method according to claim 1, wherein the first and second measures of loading comprise a size of a queue of data packets at a respective base station.

20. The method according to claim 1, wherein the first and second measures of loading comprise a measure of latency of packets at a respective base station.

21. The method according to claim 1, wherein the first and second measures of loading comprise a measure of an average data rate being provided to active user equipment terminals communicating with a respective base station.

22. The method according to claim 1, wherein the first and second measures of loading comprise a measure of a proportion of radio resource that could be offered to a user equipment terminal newly attaching to a respective base station.

23. The method according to claim 1, wherein said selecting is based on a measure of the user equipment terminal velocity or direction.

24. The method according to claim 1, wherein said selecting is further based on overall data rates provided by a respective base station to both the first user equipment terminal and at least one other user equipment terminal if said other user equipment terminal were to be handed over to it.

25. A non-transitory, computer accessible memory medium storing program instructions of optimizing effective data rates available at a first user equipment terminal in a radio communications network comprising a first base station of a first type, a second base station of a second type that is different from the first type, wherein the program instructions are executable to:

determine first and second measures of signal quality of radio communications received at the first user equipment terminal from the first and second base stations respectively;

determine first and second measures of loading of the first and said second base stations respectively, wherein the first and second measures of loading each comprises both uplink and downlink measures of loading, and wherein the first and second measures of loading relate to radio resource or to backhaul resource;

determine a first uplink effective data rate and a first downlink effective date rate for the first user equipment terminal and the first base station based on the first measure of signal quality and the first measure of loading;

determine a second uplink effective data rate and a second downlink effective data rate for the first user equipment terminal and the second base station based on the second measure of signal quality and the second measure of loading;

compare the first uplink effective data rate with the second uplink effective data rate;
compare the first downlink effective data rate with the second downlink effective data rate;
select one of the first and second base station for communication based on said comparing the first uplink effective data rate with the second uplink effective data rate and on said comparing the first downlink effective data rate with the second downlink effective data rate; and
perform communication between the selected base station and the first user equipment terminal based on said selecting.

26. The non-transitory, computer accessible memory medium of claim 25, wherein the program instructions are executed by a processor of the first user equipment terminal.

27. The non-transitory, computer accessible memory medium of claim 25, wherein the program instructions are executed by a processor of a server of the radio communication network.

28. The non-transitory, computer accessible memory medium of claim 25, wherein said selecting and said communicating are performed on a packet-by-packet basis.

29. The non-transitory, computer accessible memory medium of claim 25, wherein the first type of base station is a macrocell type and the second type of base station is a femtocell type.

30. The non-transitory, computer accessible memory medium of claim 25, wherein the second base station has an area of cellular wireless coverage within an area of cellular wireless coverage of the first base station.

31. The non-transitory, computer accessible memory medium of claim 25, wherein said selecting is performed in dependence on a service being provided or requested to be provided to the first user equipment terminal.

32. The non-transitory, computer accessible memory medium of claim 25, wherein said comparing the first downlink effective data rate with the second downlink effective data rate comprises:
determining a difference between the first downlink effective data rate and the second downlink effective data rate; and
comparing the difference to a threshold, wherein the threshold is greater than 0.

33. The non-transitory, computer accessible memory medium of claim 25, wherein the first and second measures of the signal quality comprise or are derived from a measure of strength of signals received from the first and second base stations respectively at the first user equipment terminal.

34. The non-transitory, computer accessible memory medium of claim 25, wherein the first and second measures of the signal quality comprise or are derived from a measure of signal to noise ratio or from a measure of signal to noise plus interference ratio of signals received from the first and second base stations respectively at the first user equipment terminal.

35. The non-transitory, computer accessible memory medium of claim 25, wherein said selecting is further based on a measure of the user equipment terminal velocity or direction.

36. A user equipment terminal for use in a radio communications network comprising a first base station of a first type and a second base station of a second type, different from the first type, the user equipment being arranged to optimize data rates available at the user equipment terminal, wherein the user equipment terminal comprises:
an antenna for performing wireless communication; and
control hardware coupled to the antenna, wherein the control hardware is configured to:
generate first and second measures of signal quality of radio communications received at the user equipment terminal from the first and second base stations respectively, using the antenna;
receive first and second measures of loading of the first and said second base stations respectively, using the antenna, wherein the first and second measures of loading each comprises both uplink and downlink measures of loading, and wherein the first and second measures of loading relate to radio resource or to backhaul resource;
determine a first uplink effective data rate and a first downlink effective date rate for the user equipment terminal and the first base station based on the first measure of signal quality and the first measure of loading;
determine a second uplink effective data rate and a second downlink effective data rate for the user equipment terminal and the second base station based on the second measure of signal quality and the second measure of loading;
compare the first uplink effective data rate with the second uplink effective data rate;
compare the first downlink effective data rate with the second downlink effective data rate;
select one of the first and second base station for communication based on said comparing the first uplink effective data rate with the second uplink effective data rate and on said comparing the first downlink effective data rate with the second downlink effective data rate; and
perform communication between the selected base station and the first user equipment terminal based on said selecting.

37. The user equipment terminal of claim 36, wherein said selecting and said communicating are performed on a packet-by-packet basis.

38. The user equipment terminal of claim 36, wherein the first type of base station is a macrocell type and the second type of base station is a femtocell type.

39. The user equipment terminal of claim 36, wherein the second base station has an area of cellular wireless coverage within an area of cellular wireless coverage of the first base station.

40. The user equipment terminal of claim 36, wherein said selecting is performed in dependence on a service being provided or requested to be provided to the user equipment terminal.

41. The user equipment terminal of claim 36, wherein said comparing the first downlink effective data rate with the second downlink effective data rate comprises:
determining a difference between the first downlink effective data rate and the second downlink effective data rate; and
comparing the difference to a threshold, wherein the threshold is greater than 0.

42. The user equipment terminal of claim 36, wherein the first and second measures of the signal quality comprise or are derived from a measure of strength of signals received from the first and second base stations respectively at the user equipment terminal.

43. The user equipment terminal of claim 36, wherein the first and second measures of the signal quality comprise or are derived from a measure of signal to noise ratio or from a measure of signal to noise plus interference ratio of signals received from the first and second base stations respectively at the user equipment terminal.

44. The user equipment terminal of claim 36, wherein said selecting is further based on a measure of the user equipment terminal velocity or direction.

\* \* \* \* \*